US008447428B2

(12) United States Patent
Maisonnier et al.

(10) Patent No.: US 8,447,428 B2
(45) Date of Patent: May 21, 2013

(54) METHOD FOR EDITING MOVEMENTS OF A ROBOT

(75) Inventors: Bruno Maisonnier, Paris (FR); Jérôme Monceaux, Paris (FR)

(73) Assignee: Aldebaran Robotics S.A., Paris (FR)

( * ) Notice: Subject to any disclaimer, the term of this patent is extended or adjusted under 35 U.S.C. 154(b) by 672 days.

(21) Appl. No.: 12/667,580

(22) PCT Filed: Jul. 1, 2008

(86) PCT No.: PCT/EP2008/058443
§ 371 (c)(1),
(2), (4) Date: Jan. 15, 2010

(87) PCT Pub. No.: WO2009/004004
PCT Pub. Date: Jan. 8, 2009

(65) Prior Publication Data
US 2010/0198403 A1      Aug. 5, 2010

(30) Foreign Application Priority Data

Jul. 4, 2007    (FR) ...................................... 07 04826

(51) Int. Cl.
*G06F 19/00*          (2006.01)
(52) U.S. Cl.
USPC ............ 700/245; 700/252; 700/254; 700/264
(58) Field of Classification Search
USPC ................. 700/1, 2, 3, 11, 13, 14, 15, 17, 23, 700/28–34, 56–89, 159–194, 245–264
See application file for complete search history.

(56) References Cited

U.S. PATENT DOCUMENTS

| 4,541,060 | A | * | 9/1985 | Kogawa | 700/252 |
| 4,761,745 | A | * | 8/1988 | Kodaira | 700/254 |
| 4,803,640 | A | * | 2/1989 | Mitomi et al. | 700/252 |
| 4,831,549 | A | * | 5/1989 | Red et al. | 700/254 |
| 4,987,527 | A | * | 1/1991 | Hamada et al. | 700/64 |
| 5,046,022 | A | * | 9/1991 | Conway et al. | 700/250 |
| 5,250,886 | A | * | 10/1993 | Yasuhara et al. | 318/567 |
| 5,355,064 | A | * | 10/1994 | Yoshino et al. | 318/568.12 |
| 5,467,430 | A | * | 11/1995 | Itoh | 700/260 |
| 5,675,229 | A | * | 10/1997 | Thorne | 318/568.11 |
| 6,463,358 | B1 | * | 10/2002 | Watanabe et al. | 700/253 |
| 6,535,793 | B2 | * | 3/2003 | Allard | 700/259 |
| 6,845,297 | B2 | * | 1/2005 | Allard | 700/259 |
| 7,057,643 | B2 | * | 6/2006 | Iida et al. | 348/208.14 |
| 7,236,854 | B2 | * | 6/2007 | Pretlove et al. | 700/246 |
| 2004/0012593 | A1 | | 1/2004 | Lanciault | |

* cited by examiner

*Primary Examiner* — Khoi Tran
*Assistant Examiner* — Bhavesh V Amin
(74) *Attorney, Agent, or Firm* — Baker & Hostetler LLP

(57) ABSTRACT

The invention relates to a method of editing movements of a robot on the basis of computer equipment able to communicate with the robot, the method comprising steps in which: —a plurality of reference positions of the robot are generated; —at least one time sequence of positions is generated, the time sequence of positions comprising the plurality of reference positions, and transitional movements between two successive reference positions; and the robot is made interdependent with the displacement means included in the computer equipment and causing the displacement of the robot. The robot is a real robot and/or a virtual robot displayed on a screen of the computer equipment.

14 Claims, 4 Drawing Sheets

METHOD FOR EDITING MOVEMENTS OF A ROBOT

CROSS-REFERENCE TO RELATED APPLICATIONS

This application is a National Stage of International patent application PCT/EP2008/058443, filed on Jul. 1, 2008, which claims priority to foreign French patent application No. FR 0704826, filed on Jul. 4, 2007, the disclosures of which are hereby incorporated by reference in their entirety.

FIELD OF THE INVENTION

The invention relates to a method for editing movements of a robot from a computing device suitable for communicating with the robot.

The invention also relates to a system for editing movements of a robot, including a computing device suitable for communicating with a robot.

The invention also relates to a computer program which, when executed, if it is loaded onto a computing device suitable for communicating with a robot, enables the editing of movements of the robot.

BACKGROUND OF THE INVENTION

Methods notably for editing movements of a robot are known. Such methods enable a developer or user to edit movements which the robot will then be able to reproduce. This may involve, for example, a walking or dancing movement, or more simply, the lifting or waving of an arm.

In such a known method, a computer program is loaded onto the computing device suitable for communicating with the robot. This computer program generates, for example, an interface which enables the position of one or more joints of the robot to be modified via motors associated with these joints. The interface may appear on a screen of the computing device in the form of a cursor to be moved between two boundaries, or a numerical value to be modified. The modification of the position of the cursor or the numerical value enables the position of a motor of the robot to be modified. This robot may be either a real robot separated from the computing device, or a virtual robot displayed, for example, on a screen of the computing device.

In the known methods, a plurality of positions are therefore defined for the robot thanks to the computer program loaded on the computing device.

These different positions are then integrated into a temporal sequence of positions, referred to as a "timeline". Such a temporal sequence of positions includes a series of reference positions, referred to as "keyframes", which are interlinked via a temporal transition in such a way as to define the temporal sequence of positions. In the temporal sequence of positions, the different positions to be assumed by the robot, and therefore the different positions of the motors of the robots, are generated as mentioned above from the interface displayed on the computing device, for example by means of a cursor.

An editing method of this type based on a cursor displayed on the computing device offers the advantage of enabling a fine adjustment of the reference positions in the temporal sequence of positions.

However, a method of this type is inconvenient for defining substantial movements of the robot and, therefore, rough adjustment of the positions. In particular, if the movements of the robot are defined on the basis of a cursor actuating a motor, it is complicated to manipulate the cursors of each of the motors to be actuated for a sufficient movement. The known methods for editing movements of a robot do not therefore enable a user to edit a wide range of movements in a simple manner.

SUMMARY OF THE INVENTION

The problem solved by the invention is therefore to facilitate the editing of a wide range of movements of a robot.

This problem is solved, according to a first aspect of the invention, by a method for editing movements of a robot from a computing device suitable for communicating with the robot, the method comprising steps in which:
  a plurality of reference positions of the robot are generated;
  a temporal sequence of positions is generated, the temporal sequence of positions including the plurality of reference positions, and transition movements between two successive reference positions;
in which the step consisting in generating the plurality of reference positions includes steps in which:
  a reference position of the temporal sequence of positions is generated by movement means of the computing device, the movement means instigating the movement of the robot, in such a way as to define the reference position;
the step consisting in generating the plurality of reference positions, furthermore including a step in which:
  the reference position is furthermore generated by moving the robot into a required position;
  characteristics of the required position are recorded on a computing device,
  the reference position is defined on the basis of characteristics of the required position.

Thanks to the invention, a user may therefore define the reference positions firstly by a rough adjustment of the position of the robot, by moving the robot really or virtually, then by a fine adjustment thanks to movement means of the computing device.

This enables the simple generation of a large number of positions of the robot.

According to one embodiment, the step consisting in generating the plurality of reference positions furthermore includes a step in which:
  a graphical representation is displayed of the temporal changes in the characteristics of at least one joint of the robot according to the temporal sequence of positions;
  the graphical representation of the temporal changes is modified in such a way as to modify the temporal sequence of positions;
  a new temporal sequence of positions is generated according to the modifications of the graphical representation.

According to one embodiment, the robot includes a plurality of joints, and the method includes a step in which:
  a plurality of temporal sequences of positions are generated, each of the temporal sequences of positions including reference positions corresponding to positions of some of the joints from the plurality of joints.

In this embodiment, the temporal sequences of positions of the plurality of temporal sequences of positions are read simultaneously in such a way as instigate a movement of the robot for the plurality of joints.

According to one embodiment, the robot is a real robot.

According to a different embodiment, the robot is a virtual robot displayed on a screen of the computing device.

In this case, the virtual robot is generated on the basis of a real robot and a simulator, the simulator being designed in such a way that each movement of the real robot is capable of instigating the same movement for the virtual robot, and each movement of the virtual robot is capable of instigating the same movement for the real robot.

The aforementioned problem is also solved, according to a second aspect of the invention, by a computer program which, when executed, if it is loaded onto a computing device suitable for communicating with a robot, enables the editing of movements of the robot according to the previously described method.

The invention also relates to a system for editing movements of a robot, including a computing device suitable for communicating with the robot, the system including first means to generate a plurality of reference positions of the robot;
second means to generate a temporal sequence of positions, the temporal sequence of positions including the plurality of reference positions, and movements between two successive reference positions;
movement means suitable for instigating the movement of at least one motor of the robot;
third means to generate a reference position of the temporal sequence of positions on the basis of movement means of a computing device in such a way as to define the reference position;
fourth means to furthermore generate the reference position by moving the robot into a required position, to record, on the computing device, the characteristics of the required position, and to define the reference position on the basis of the characteristics of the required position.

According to one embodiment of the aforementioned system, the system includes means to display a graphical representation of the temporal changes in the characteristics of at least one motor of the robot according to the temporal sequence of positions; means to modify the graphical representation of the temporal changes in such a way as to modify the temporal sequence of positions, and means to modify a new temporal sequence of positions according to the modifications of the graphical representation.

According to one embodiment, the robot includes a plurality of joints, and the system includes means to generate a plurality of temporal sequences of positions, each of the temporal sequences of positions including reference positions corresponding to positions of some of the joints from the plurality of joints.

In this case, the system comprises means for simultaneously reading the temporal sequences of positions of the plurality of temporal sequences of positions in such a way as to instigate a movement of a robot according to the plurality of joints.

BRIEF DESCRIPTION OF THE DRAWINGS

An embodiment of the invention will now be described with reference to the attached figures, in which.

DETAILED DESCRIPTION

Figure 1:
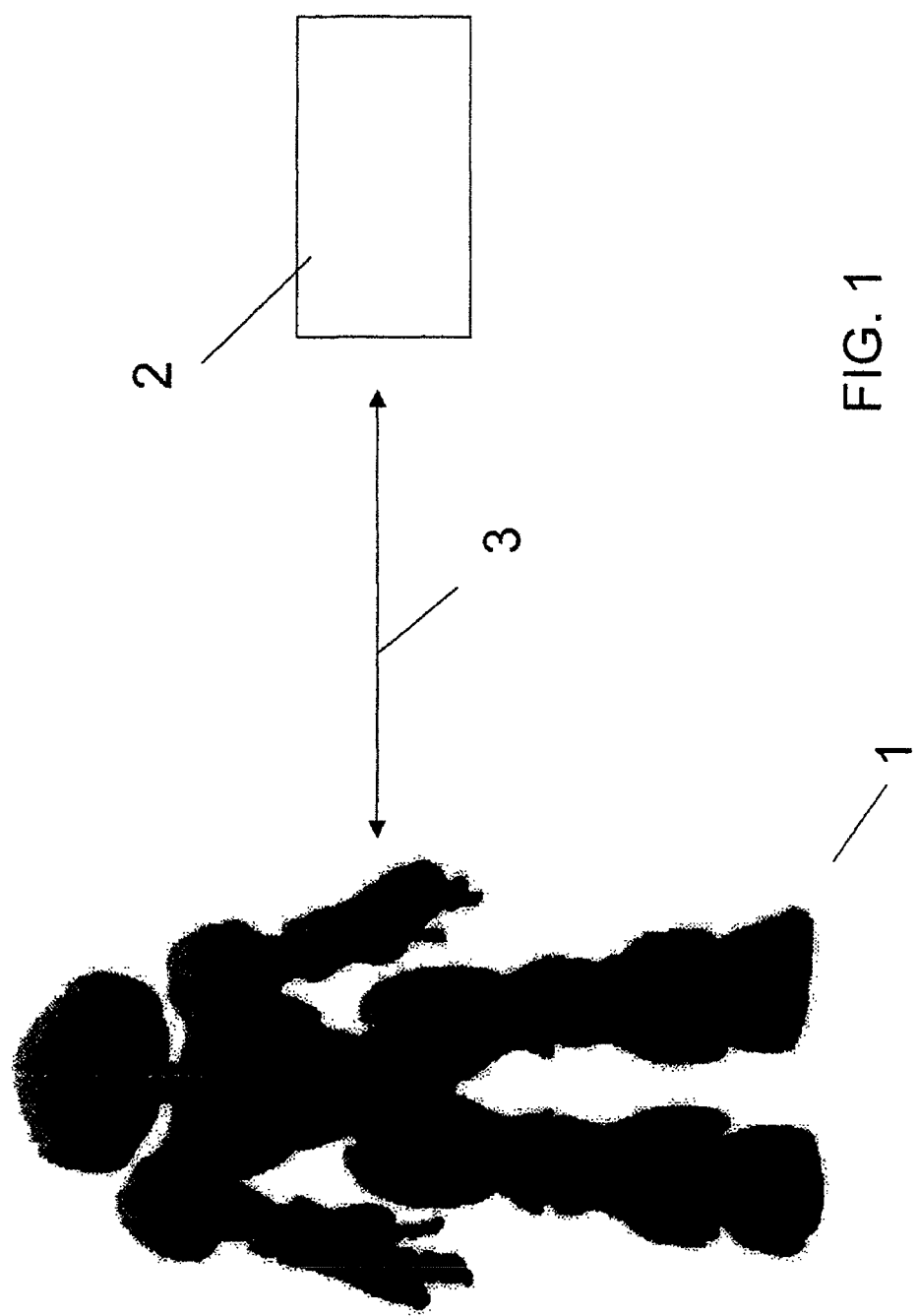
FIG. 1 shows a system according to the invention.

FIG. 1 shows, in a general manner, a real robot 1. The invention enables the editing of movements of the real robot 1. The real robot 1 includes motors, in its joints, and sensors enabling the position of the motors to be determined. The real robot 1 is suitable for communicating, i.e. exchanging data, with a computing device 2 via communication means 3. These communication means 3 are, for example, of the WiFi wireless network type.

Figure 2:
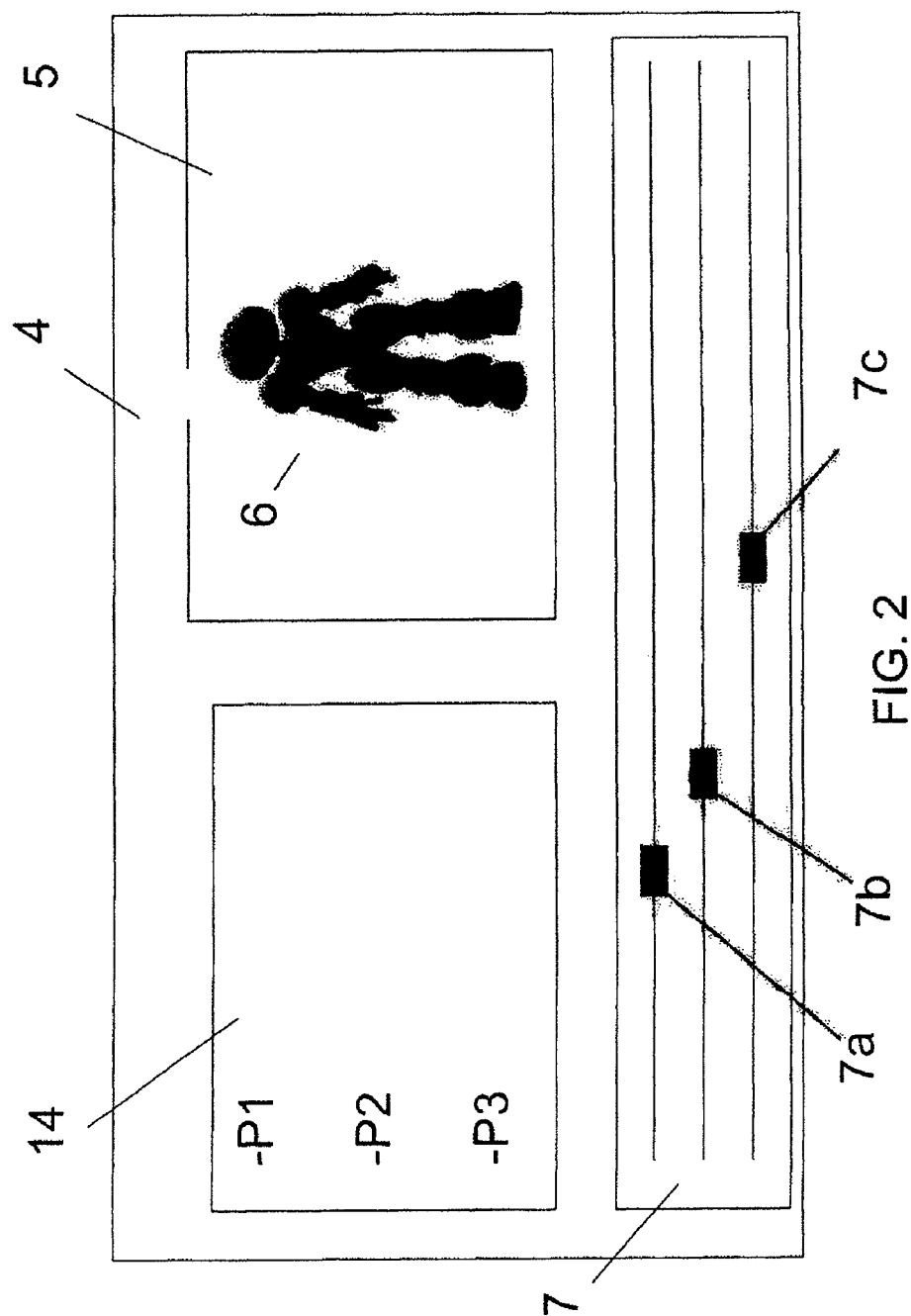
FIG. 2 shows a first interface for the implementation of the method according to the invention.

FIG. 2 shows a first interface 4 for the implementation of the method for editing movements of a robot according to the invention. This interface 4 is generated on a screen of the computing device 2 if a computer program is loaded onto the computing device 2.

The first interface 4 includes a window 5 providing a virtual representation in the form of a virtual robot 6 of the real robot 1. The virtual robot 6 is implemented through simulation of the real robot 1 using a simulator. The simulator may be activated or de-activated, and enables the visualization in the window 5 of the movements and actions of the real robot 1, and also the possible lights, sounds or words produced by the real robot 1. The simulator incorporates the laws of physics, and causes, for example, the robot to fall if it is unbalanced, and instigates a contact if the real robot touches an object. In order to facilitate the definition of the movements, the simulator also enables the visualization of the image recorded by a camera integrated in the real robot 1. This enables the definition of the movements of the real robot 1 on the basis of the virtual robot 6, while taking account of the environment of the real robot 1. The simulator is linked to the real robot 1 in such a way that all of the behaviors of the real robot 1 may be carried out on the virtual robot 6. If the simulator is activated, a movement on the virtual robot 6 instigates the same movement on the real robot 1. Similarly, a movement on the real robot 1 instigates the same movement on the virtual robot 6. A plurality of real robots 1 may also be represented in the window 5 in the form of a plurality of virtual robots 6, even if the real robots 1 are not physically close, in such a way that the real robots 1 can be controlled in a grouped and synchronized manner from the simulator.

Since the stimulator equally enables the control of both the real robot 1 and the virtual robot 6, the description of the invention which follows and the actions on the robot are applicable in an identical manner to the virtual robot 6 and to the real robot 1. If the user defines complex movements of the robot in which the latter risks falling, the use of the virtual robot will be particularly preferred by at least partially de-activating the simulator to avoid damaging the real robot 1.

In the continuing description, actions on the real robot 1 will be described, but it is understood that the same actions can be applied to the virtual robot 6.

The zone 7 of the interface 1 includes a plurality of cursors 7a, 7b, 7c capable of being moved, for example, thanks to a mouse associated with the computing device 2. Each of the cursors defines a position of a motor of the real robot 1 and therefore of a joint of the real robot 1. If one of the cursors is moved as far as a certain value, the associated motor is moved according to the movement of the cursor. The cursors 7a, 7b, 7c therefore correspond to movements of a motor in a joint of the robot, for example, the motors of the head, elbow and shoulder respectively.

The cursors 7a, 7b, 7c enable a fine adjustment of the position of the associated motors.

According to the invention, it is also possible to define a position of the real robot 1 by moving, for example manually, the real robot 1. This manual movement defines a required position for the robot. This required position is then recorded by the computing device 2. This type of movement notably enables a rough definition of the positions of the robot, for example by making the arm of the robot move from a low position to a high position by actuating the motor of the shoulder. The changes in positions or movements of the cursors 7a, 7b and 7c and of the robot are thus interdependent or linked.

Following this rough movement, a fine movement with the aid of the cursors 7a, 7b and 7c previously described enables fine adjustment of the position of the robot. The combination of the possibilities of fine and rough movements previously described enables a user to edit, in a simple manner, a large number of movements of the robot.

In order to further simplify the definition of the positions of the robot, the interface 4 may also include a window 14 including a list of predefined positions P1, P2, P3. The parameters of the joints associated with the motors are associated with each of these positions. By clicking on an element from this list, for example using a mouse, the robot assumes the position defined by these parameters.

Figure 3:
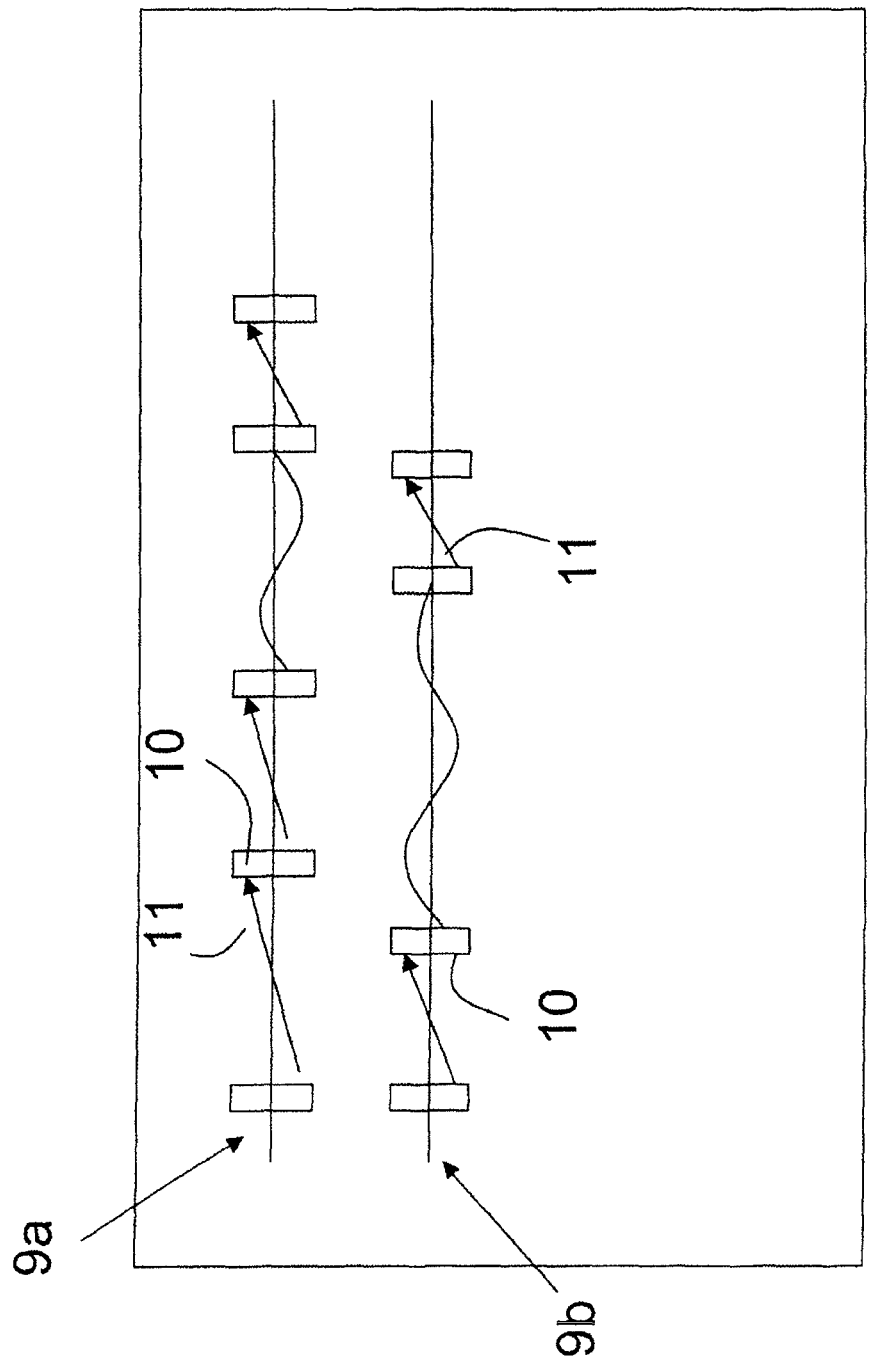
FIG. 3 shows a second interface including a temporal sequence of positions for the implementation of the method according to the invention.

Reference positions of the robot are defined on the basis of these different means of positioning of the robots. As shown in FIG. 3, these reference positions are inserted into a temporal sequence of positions 9a, 9b, including reference frames 10. Each of the reference frames 10 corresponds to a reference position 10 of the robot, i.e. to the definition of the characteristics of each motor of the robot or some of the motors of the robot.

In order to generate the temporal sequence of positions 9a, 9b on the basis of the reference positions 10, a movement is defined corresponding to a transition 11 between two reference positions 10. The transition may be a linear transition, in which the movement of each joint associated with a motor is regular and at a constant speed between the two reference positions 10. The transition may also be a smooth transition, in which the movement presents an acceleration then deceleration phase in such a way that the overall movement does not present any spurts at each reference position. Other types of transition may also be added and defined by a user.

According to the invention, different temporal sequences of positions 9a, 9b can be used for different subsets of the set of motors and joints of the robot. For example, the sequence 9a may correspond to movements of the motors of the upper part of the robot, including, notably, the shoulders, elbows and head, and the sequence 9b may correspond to the movements of the motors of the lower part of the robot, including, notably, the hips, knees, and ankles. This substantially facilitates the possibilities for defining the movements of the robot, since a reference frame does not have to include the definition of the positions of all of the joints, but only some of them. In instigating the different temporal sequences 9a, 9b in a synchronized manner, a movement of the entire robot is then obtained. Each of the sequences 9a, 9b can be activated or de-activated and instigated independently of the other sequences. In the event of a conflict between two sequences, i.e. if, during the reading of two distinct sequences, the same joint must assume two different positions at the same time, it is possible either to prioritize one sequence over another, or to proceed with an average of the two positions.

It is also possible to specify the time interval between two reference frames and copy the characteristics from one frame into another frame. In order to verify that the movement of the robot defined in the temporal sequence of positions corresponds exactly to the required movement, the defined sequence can be played with the aid of a sequence-reading function.

Figure 4:
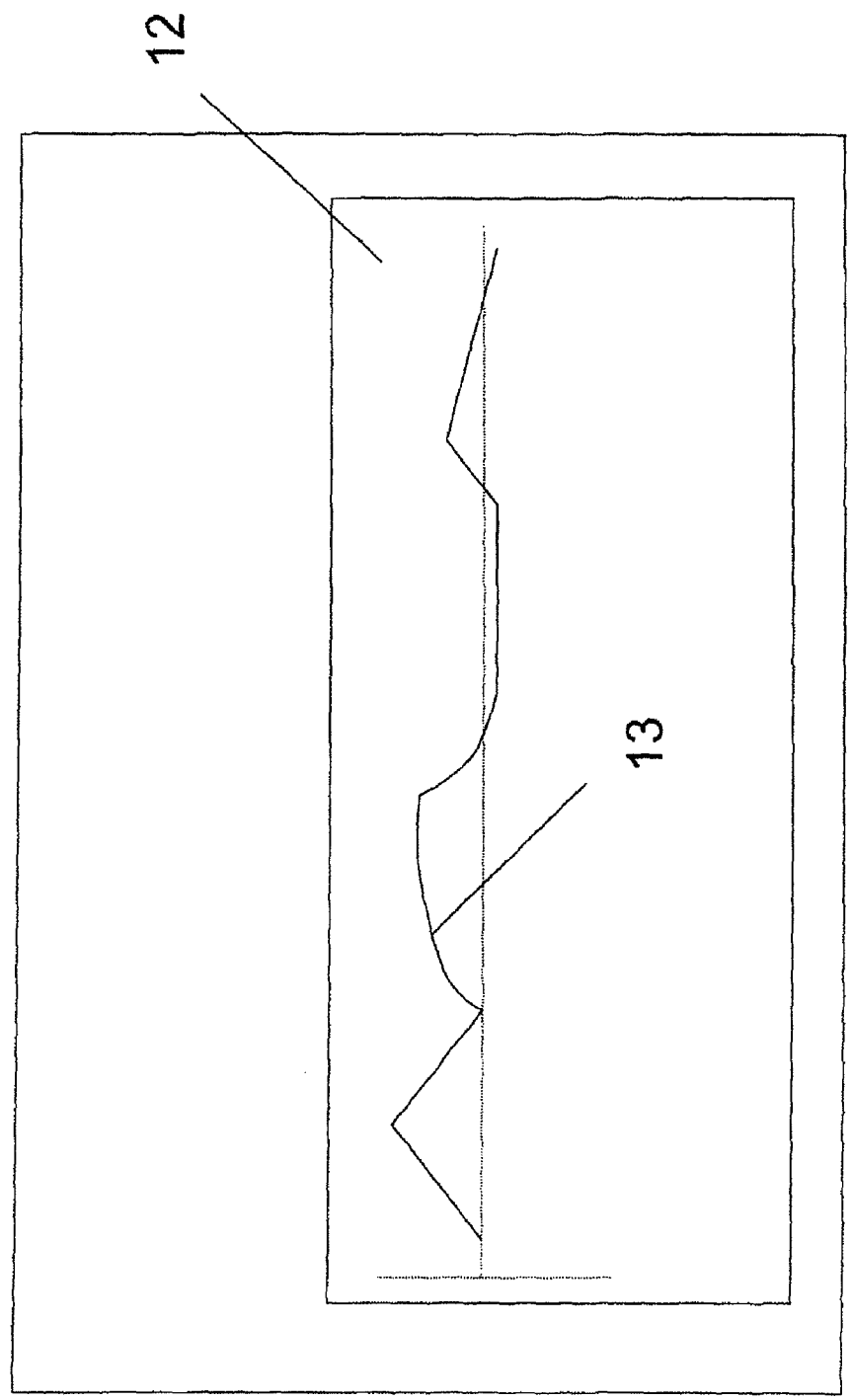
FIG. 4 shows a third interface for the implementation of the method according to the invention.

When the temporal sequence of positions is defined, the position of a particular joint can be displayed as a function of time. A window 12 implementing such a display is shown in FIG. 4. In FIG. 4, the window 12 includes a diagram 13 illustrating the changes in the position of a joint associated with a motor of the robot. The diagram 13 is editable and can be modified with the aid of a mouse associated with the computing device 2. The editing of the diagram 13 also enables a fine adjustment of the transitions between two reference positions, and a fine adjustment of the positions of the joint within a reference frame, in order to define a new reference position.

All of the functions defined above thus enable a particularly simple editing of the movements of the robot, even by a novice user of robotics programming. Furthermore, each of the positions or temporal sequences of positions defined thanks to the invention may, having been stored in a memory, be exchanged by users, in such a way that a community of numerous users can improve the editing of the movements of the robot, each of the users of the community being able to use the movements edited by the other users of the community.

The invention claimed is:

1. A method for editing movements of a robot from a computing device suitable for communicating with the robot, the method comprising steps in which:
   a plurality of reference positions of the robot are generated;
   at least one temporal sequence of positions is generated, the temporal sequence of positions including the plurality of reference positions, and transition movements between two successive reference positions;
   an interdependence being created between the robot and movement means included in the computing device and instigating the movement of the robot, and
   in that the robot is a real robot and/or a virtual robot displayed on a screen of the computing device.

2. The method as claimed in claim 1, wherein the step consisting in generating the plurality of reference positions includes a step in which a reference position of the temporal sequence of positions is generated by movement means included in the computing device, the movement means instigating the movement of the robot, in such a way as to define the reference position.

3. The method as claimed in claim 1, wherein the step consisting in generating the plurality of reference positions furthermore includes a step in which:
   the reference position is furthermore generated by moving the robot into a required position;
   characteristics of the required position are recorded on the computing device,
   the reference position is defined on the basis of characteristics of the required position.

4. The method as claimed in claim 1, wherein the step consisting in generating the plurality of reference positions furthermore includes a step in which:
   a graphical representation is displayed of the temporal changes in the characteristics of at least one joint of the robot according to the temporal sequence of positions;
   the graphical representation of the temporal changes is modified in such a way as to modify the temporal sequence of positions;
   a new temporal sequence of positions is generated according to modifications of the graphical representation.

5. The method as claimed in claim 1, wherein the robot includes a plurality of joints, and in which
   a plurality of temporal sequences of positions are generated, each of the temporal sequences of positions including reference positions corresponding to positions of some of the joints from the plurality of joints.

6. The method as claimed in claim 1, wherein the temporal sequences of positions of the plurality of temporal sequences of positions are read simultaneously, in such a way as to instigate a movement of the robot for the plurality of joints.

7. The method as claimed in claim 1, wherein the virtual robot is generated on the basis of a real robot and a simulator, the simulator being designed in such a way that each movement of the real robot is capable of instigating the same movement for the virtual robot, and each movement of the virtual robot is capable of instigating the same movement for the real robot.

8. A system for editing movements of a robot, including a computing device suitable for communicating with the robot, the system including:
- first means to generate a plurality of reference positions of the robot;
- second means to generate a temporal sequence of positions, the sequence including the plurality of reference positions, the movement of the robot between two reference positions being generated on the basis of an interpolation;
- movement means suitable for instigating a movement of the robot, interdependent with the robot,
- the robot being a real robot and/or a virtual robot displayed on a screen of the computing device.

9. The system as claimed in claim 8, further including third means to generate a reference position of the temporal sequence of positions on the basis of the movement means included in the computing device in such a way as to define the reference position.

10. The system as claimed in claim 8, further including fourth means for furthermore generating the reference position by moving the robot into a required position, to record, on the computing device, the characteristics of the required position, and to define the reference position on the basis of the characteristics of the required position.

11. The system as claimed in claim 8, including means to display a graphical representation of the temporal changes in the characteristics of at least one motor of the robot according to the temporal sequence of positions; means to modify the graphical representation of the temporal changes in such a way as to modify the temporal sequence of positions, and means to modify a new temporal sequence of positions according to the modifications of the graphical representation.

12. The system as claimed in claim 8, wherein the robot includes a plurality of joints, and in which the system includes means to generate a plurality of temporal sequences of positions, each of the temporal sequences of positions including reference positions corresponding to positions of some of the joints from the plurality of joints.

13. The system as claimed in claim 12, including means to read simultaneously the temporal sequences of positions of the plurality of temporal sequences of positions in such a way as to instigate a movement of the robot according to the plurality of joints.

14. A nontransitory computer readable medium for editing movements of a robot, the medium including a program thereon which, when executed by a computing device suitable for communicating with the robot, causes the computing device to perform:
- generate a plurality of reference positions of the robot generate at least one temporal sequence of positions, the temporal sequence of positions including the plurality of reference positions, and transition movements between two successive reference positions; and
- create an interdependence between the robot and movement means included in the computing device and instigating the movement of the robot,
- wherein the robot is a real robot and/or a virtual robot displayed on a screen of the computing device.

* * * * *